United States Patent [19]

Hill

[11] 3,839,213

[45] Oct. 1, 1974

[54] DENTURE CLEANSING COMPOSITIONS

[75] Inventor: William H. Hill, Stamford, Conn.

[73] Assignee: Peter Strong Research and Development Company, Inc., Port Chester, N.Y.

[22] Filed: Feb. 1, 1972

[21] Appl. No.: 222,683

Related U.S. Application Data

[63] Continuation-in-part of Ser. Nos. 385,029, July 24, 1964, abandoned, and Ser. No. 732,086, May 27, 1968, Pat. No. 3,652,420.

[52] U.S. Cl................ 252/89, 252/101, 252/143, 424/56
[51] Int. Cl................................................ C11d 7/52
[58] Field of Search............ 252/89, 142, 143, 145, 252/305, 316; 106/35; 424/56, 49

[56] References Cited
UNITED STATES PATENTS

| | | | |
|---|---|---|---|
| 2,629,696 | 2/1953 | Dodd et al. | 252/145 |
| 2,672,449 | 3/1954 | Snell et al. | 252/316 |
| 3,075,923 | 1/1963 | Berst | 252/144 |
| 3,218,263 | 11/1965 | Boyle et al. | 252/305 |
| 3,250,680 | 5/1966 | Menkart et al. | 424/56 |
| 3,462,525 | 8/1969 | Levinsky et al. | 424/56 |
| 3,652,420 | 3/1972 | Hill | 252/143 |

*Primary Examiner*—William E. Schulz
*Attorney, Agent, or Firm*—Frank H. Wisch

[57] ABSTRACT

A cleansing composition is provided in the form of a spreadable acidic gel. Though the product contains an abrasive, it is not opaque but is preferably clear or transparent, and may be from transparent to translucent, or even cloudy or somewhat turbid, and yet it effectively cleanses and polishes surfaces and removes tartar and other oral deposits from dentures by an improved abrasive, polishing and scouring action.

3 Claims, No Drawings

3,839,213

DENTURE CLEANSING COMPOSITIONS

CROSS-REFERENCES TO RELATED APPLICATIONS

The present application is a continuation-in-part of application Ser. No. 385,029 filed July 24, 1964 (now abandoned), and of application Ser. No. 732,086 filed May 27, 1968, now U.S. Pat. No. 3,652,420 granted Mar. 28, 1972.

BACKGROUND OF THE INVENTION

Acid cleansers for dentures have long been proposed and produced in liquid form and as pastes but have not proven sufficiently satisfactory. Acid cleansers in liquid form are less desirable than those in thickened or paste forms, since the liquid is apt to drip or to be spilled, and when spattered onto clothing or other materials is frequently likely to cause irreparable damage. Acid cleansers in thickened form have generally not been prepared without difficulty or as sufficiently stable and aesthetically attractive products for use by consumers.

Acid gels, prepared as set forth in the above-mentioned prior copending applications Ser. No. 385,029 and Ser. No. 732,086, have been successfully used in daily cleansing of dentures. The gels so used have been applied to dentures and rubbed over the surfaces with the fingers or with a brush. The dentures were effectively cleaned within a short period of minutes. In the case of old dentures or dentures that have not been subjected to a cleansing treatment for an appreciably long time, deposits are left that are not so readily removed. Though there are agents that are effective in removing such deposits, there is danger of severely scratching the denture surfaces, and though an agent may be effective, a desired attractive appearance in the gel product in use is not readily obtained with such agent.

SUMMARY OF INVENTION

The present invention relates to cleansing compositions and methods of preparing the same, and in particular to compositions for cleansing dentures and the preparation of such compositions in which constituents are so combined that products are provided with outstanding characteristics from the standpoint of attractiveness as saleable goods and convenience in application, as well as increased effectiveness in the cleansing of dentures.

In an improved denture cleanser of the present invention, a preferred combination including an acid component, a solvent component, and a gelling component, as well as an abrasive component, is obtainable to provide a product with a desired combination of characteristics. Surface activating effects are advantageously obtained with a selected acid component. Various surfactants are also found to be employable for obtaining a variety of effects and desired gel characteristics. Though the cleanser may vary in its characteristics and particularly in its consistency from relatively thin to relatively thick, and in clarity from clear, or limpid, transparent to translucent or cloudy or slightly turbid, constituents are brought together in preferred combinations and in preferred procedures primarily to obtain a preferred homogeneous, glass-clear product with a preferred uniform gel structure as well as an abrading action.

An object of the present invention is to provide improved denture cleanser products and methods of preparing the same. A further object is to provide a denture cleanser with preferred characteristics, and a preferred method of processing to reproduce such characteristics. More specifically, an object is to provide a stable, preferably glass-clear, acid gel, free from syneresis, or objectionable odor or corrosiveness; harmless to dentures, textiles or human skin, without sting to the latter; and readily and easily removable from plastic, metal, or other solid surfaces by rinsing, without leaving any undesirable after-taste. Another object is to provide an improved, preferably transparent, bubble-free acid gel and improvements in methods of avoiding the presence of bubbles in acid gels.

It has been found possible to provide an acidic gel that is readily dispensed from a squeeze tube and is spreadable in a flow-resistant layer even on vertical denture surfaces, the said gel containing ingredients for providing an abrasive as well as a polishing and scouring effect, and maintainable substantially transparent or glass-clear in bulk or in relatively thin layers, and not more than turbid or translucent and yet not opaque. When applied in a thin layer that is transparent, turbid or translucent, it is generally possible that stains on a surface to be cleaned, can be seen through the layer, and, as rubbing or brushing proceeds the removal of the stains is more readily noticeable before the gel is subsequently washed away with water.

DETAILED DESCRIPTION

Various acids are available that will dissolve and remove oral deposits from dentures. It is possible to obtain a thickened acid product with such acids as hydrochloric, sulfuric, nitric, phosphoric, acetic, formic, citric, hydrofluoric, fluoboric, fluosilicic, perchloric, and others, but the sulfonic acids have been found preferable in the product of the present invention from a number of standpoints, particularly in providing a glass-clear acid gel having the combined properties referred to above. An odorless, stable gel is more readily prepared with the latter acids, and is less apt to be corrosive. Many of the organo-sulfonics serve both as acid cleansers and as surfactants, and the gels containing them are more easily removable from denture surfaces by rinsing with tap water, without precipitation or deposition of insoluble alkaline earth salts, as well as without leaving an after-taste.

The aliphatic, long-chain alkyl sulfuric acids are other examples of useful acid substances which function in the gel both as acids and as surfactants, and can be used instead of the above-mentioned acids in making gels of the present invention. Specifically, lauryl sulfate, or products obtained by sulfating alcohols such as lauryl, cetyl and oleyl alcohols, or their mixtures, may be mentioned.

It has been discovered in the development of a product of the present invention that sulfonic acids, such as, preferably, the so-called ABS acids, such as the product sold as LS—320, or specifically a nuclear long-chain alkyl benzene sulfonic acid, such as dodecyl benzene sulfonic acid, or other long-chain alkyl benzene sulfonic acids, have outstanding effects in the processes employed as noted hereinbelow, in providing glass-clear, acid gels.

Other sulfonic acids are specifically noted, as for example, sulfamic acid, benzene, toluene, and xylene sulfonic acids, and the like. Sulfonic acids with the following C and H groups, based on either propylene tetramer or dodecene, or n-paraffins, are usable:

$C_{10}H_{21}$ $C_{11}H_{23}$ $C_{12}H_{25}$ $C_{13}H_{27}$ $C_{14}H_{29}$ $C_{15}H_{31}$

At least one acid is used in the gel. However, mixtures of acids mentioned above are noted for use, as for example, hydrochloric acid and sulfonic acid such as dodecyl benzene sulfonic acid, and mixtures of other acids.

Sulfonic acid products, which are usable, are made from "Neolene" (LS—320), and "Nalkylene" (SA—597), by Continental Oil Company. The typical alkyl group distribution of LS—320, based on propylene tetramer or dodecene, is:

| | |
|---|---|
| $C_{10}H_{21}$ | 4.5% |
| $C_{11}H_{23}$ | 25.9% |
| $C_{12}H_{25}$ | 53.4% |
| $C_{13}H_{27}$ | 11.7% |
| $C_{14}H_{29}$ | 3.4% |
| $C_{15}H_{31}$ | 2.0% |

The typical alkyl group distribution of SA—597, based on n-paraffins, is:

| | |
|---|---|
| $C_{10}H_{21}$ | 13.9% |
| $C_{11}H_{23}$ | 40.8% |
| $C_{12}H_{25}$ | 35.9% |
| $C_{13}H_{27}$ | 8.9% |
| $C_{14}H_{29}$ | 0.5% |

In the application of biodegradable agents, n-dodecyl benzene sulfonic acid or similar compounds in which the alkyl group is a straight-chain alkyl, rather than a heavy-branching chain such as tetrapropyl, are useful. Also, lauryl sulfates, and sulfonated straight-chain hydrocarbons, free of branched-chain, cyclic or aromatic compounds, and with average chain lengths of 10 to 18 carbon atoms are noted. So-called "keryl" benzene sulfonate, may also be mentioned. This is made from a refined kerosene fraction which is used to alkylate benzene, the alkylated product then being sulfonated.

Straight-chain hydrocarbons of various chain lengths and of high quality obtained from petroleum are used to produce alkane sulfonic acids, which may be used in the acid gel.

The solvent component includes at least one of the mono and polyhydric alcohols. Monohydric alcohols such as ethyl, isopropyl, normal butyl, secondary butyl, tertiary butyl, methyl isobutyl, primary amyl, hexyl, isooctyl, decyl, dodecyl, tridecyl, 2-octyldodecyl ("Eutanol" G sold by Henkel International GMBH of Dusseldorf, Germany), and 2-ethylhexyl alcohols; polyhydric alcohols, such as ethylene and propylene glycols of various chain lengths, their esters, and their ethers, such as ethylene glycol monoethyl ether ("Cellosolve"), diethylene glycol monoethyl ether ("Carbitol"), propylene glycol methyl ether, dipropylene glycol methyl ether, glycerine, sorbitol, mannitol, pentaerythritol, polyethylene glycol, polypropylene glycol, and others are noted as solvents.

Mixtures of two or more alcohols, be they monohydric or polyhydric alcohols; mixtures of lower alcohols, mixtures of higher alcohols, or mixtures of lower with higher alcohols, are noted as ingredients of the solvent component. The higher alcohols have a tendency to exercise a greater solvent effect on tobacco stains or tars. Lower alcohols, however, are easier to rinse off with water. Where alcohols in their pure state are solids, they are preferably used in combination with another alcohol or other alcohols in such proportions that the resulting combination is a mixture that is liquid at or near room temperatures. Although at least one polar solvent may be used in the composition, mixtures of solvents are advantageously usable. Combinations of propylene glycol with isopropanol and other monohydric alcohols have provided particularly outstanding results and are preferred for use. Also, combinations of glycerine with isopropanol and other monohydric alcohols have given equally good results.

An aqueous-alcoholic solvent is generally used to advantage. Water, when included in certain proportions, improves the gel formation and structure. The solvent component serves not only as a thinner but also in the deaeration of the gels. It is found that thinning for the purpose of deaeration can be effected while avoiding syneresis in a final product. A range of proportions of water and other solvents applicable to various possible combinations of ingredients cannot be definitely stated. It differs for each different combination. Too little water as well as too large amounts of water tend to thin out the gel. Too much organo solvent tends to thin out a gel and to produce and increase haze, and to increase syneresis on standing. Some water, is believed to be preferable for good gel formation.

Various surfactants, including the nonionics, anionics and cationics, as noted hereinbelow, are introduced, if desired, and in certain instances as auxiliary agents which may serve to effect thickening of a gel and to improve gel structure, though good gels are obtained in certain cases without auxiliary surfactants. Usually a dispersible or preferably a compatible surfactant is included to effect more thorough removal of the cleanser by rinsing.

Triethanolamine is advantageously utilized by including it in a formulation in which the sulfonic acids, or specifically alkyl benzene sulfonic acids, are used in the acid component. The triethanolamine salt may be added to a formulation as such, or it may be formed in situ while leaving an excess of the acid as free acid in the acid component. The substitution for triethanolamine of mono- or diethanolamine, any one of the isopropanolamines, n-propylamine, n-hexylamine, morpholine, is noted.

In the gelling component for obtaining a gel of a desired consistency in formulations herein presented a thermally produced silica is found to provide gel products unexpectedly superior to products obtained with, for instance, "Carbopol" 934, said to be carboxypolymethylene (sold by B. F. Goodrich Chemical Co.), or Na carboxymethyl cellulose. "Carbopol" 940 and 941 are other members of the "Carbopol" group said to include carboxy vinyl polymers. The materials of the Carbopol group are also said to be polymers of acrylic and/or methacrylic acid, in turn said to be made by polymerization or co-polymerization of the corresponding methyl esters and subsequent saponification of the polymers. Another gelling agent to be mentioned for satisfactory use is "Natrosol," a non-ionic gelling agent made by Hercules, Inc. and consisting of hydroxyethyl cellulose.

"Cab-O-Sil" (made by Godfrey L. Cabot, Inc.), which is not considered to be an abrasive, not only provides a gelling effect but also transparent, crystal-clear cleanser products with said formulations as presented hereinbelow. It is a colloidal, submicroscopic, pyrogenic silica prepared in a hot, gaseous environment by a vapor-phase, flame hydrolysis, at high temperature (1,100°C.), of a silicon compound, such as silicon tetrachloride. It is distinct from silica gel obtained by precipitation of silicic acid from an aqueous silicate solution, and hardening of the precipitate. Silica gel, thus formed, is internally porous and is adapted for use in the present acid-gel product, particularly with treatment described hereinbelow.

Cab-O-Sil contains no water-soluble inorganic salts. It is of high chemical purity, low water content, has enormous external surface area and no internal porosity. It has a high degree of particle separation and the particles are almost spherical in shape. The properties and composition of a grade of Cab-O-Sil are listed as follows:

| | |
|---|---|
| Silica content (moisture-free) | 99.0–99.7% |
| Free moisture (105° C.) | 0.2–1.5% |
| Ignition loss of 1000° C. (excluding moisture) | 0.2–1.0% |
| CaO, MgO | 0.00% |
| $Fe_2O_3 + Al_2O_3$ | 0.01% |
| Particle size range | 0.015–0.020 micron. |
| Surface area | 175–200 Sq.m./gm. |
| Specific gravity | 2.1 |
| Color | white |
| Refractive index | 1.46 |
| pH (4% aqueous dispersion) | 3.5–4.2 |
| Apparent bulk density | 2.5–7.0 lbs./cu.ft. |

A finer grade of Cab-O-Sil has the above characteristics but a particular size range of 0.007–0.010 micron, a surface area of substantially 325 sq.m./gm., and a refractive index of 1.46.

The various grades of Cab-O-Sil may be used interchangeably as a dispersed phase in the acid gel.

The more nearly the refractive index of the Cab-O-Sil is approached by the refractive index of the liquid constituents or surrounding medium in the gel, the greater the likelihood of obtaining gel with combined characteristics referred to above, including the preferred glass-clear appearance. The refractive index of the continuous acid gel phase of a preferred product is in the range 1.40 to 1.50. Gels are generally prepared having a refractive index of 1.46.

When a colorless gel product is desired, and when the alkyl benzene sulphonic acid, particularly a commercial grade of dodecylbenzene sulfonic acid, or other sulfonic acid, is colored, it may be decolorized by means of hydrogen peroxide. The acid can be decolorized, for example, by diluting it in a solvent and treating the solution with hydrogen peroxide. The decolorizing may be accomplished in the process of making the gel. About 1 ml. of 30% hydrogen peroxide per 100 grams of gel, or per 35 grams of the acid, is approximately a sufficient proportion. When the proportion is too high, a gel after treatment is apt to contain bubbles. Varying amounts of hydrogen peroxide may be used. An excess, if left in a gel, has not only an effect in decolorizing a gel but also in decolorizing any stains on denture surfaces. The acidity of the gel and its alcohol or ether content serve to stabilize the hydrogen peroxide solution remaining in the product until it is put to use.

As a substitute for hydrogen peroxide, organic peroxides, such as benzoyl peroxide, are noted. Hydroperoxides, such as cumene hydroperoxide, are also mentioned.

It is found that the acid gels herein described may have a desired limipidity and yet may possess an effective abrasiveness for removal of oral deposits and which will not objectionably scratch denture surfaces in a cleansing process. Satisfactory gels sufficiently clear are obtainable with such abrasive materials as the following in proportions depending on the abrasive factor of each and particularly with certain treatment as indicated below: silica gel, fluorspar or fluorite; various amorphous and crystalline forms of silicon dioxide found in nature, including cristobalite, tridymite, quartz, opal, flint, and others; "Min-U-Sil" (high grade silica particles sold by American Graded Sand Co.); sodium and/or potassium aluminum silicates, including pumice (synthetic or natural), natrolite, sodalite; aluminum silicates such as mullite, sillimanite, andalusite, cyanite and others; powdered glasses; alumina such as corundum, and Alundum (a proprietary product of the Norton Co.); Dicalite (a product of Great Lakes Carbon Corporation); and others.

Such abrasives as alumina, calcium pyrophosphate, and zirconia tend to produce opaque gels.

A small proportion of an abrasive is used in a gel and not enough to scratch seriously the denture surfaces, particularly the acrylic resin part. A range of proportions by weight in a gel is substantially 0.1% to substantially 25%, while maintaining a desired transparency at least in a layer on a denture surface. The range of proportions of an abrasive in the gel product depends on the refractive index of the abrasive as well as on the abrasiveness of the product when in use on a denture while also maintaining a desired transparency.

The gel in the product of the present invention has a refractive index of substantially 1.40 to substantially 1.50. The following table illustrates examples of abrasives with refractive indices, that can serve in the preparation of the gel product.

| | Refractive Index |
|---|---|
| Fluorspar (Fluorite) | 1.43 |
| Andalusite | 1.64 |
| Cyanite | 1.72 |
| Corundum | 1.77 |
| Quartz | 1.55 |
| Tridymite | 1.47 |
| Cristobalite | 1.48 |
| Opal, flint, silica gel | 1.41–1.46 |

An abrasive gel composition of the present invention that has a transparency in bulk or when it is at least in a layer on a denture surface and yet contains an abrasive agent in proportions that do not cause objectionable scratching of denture surfaces, may serve as a denture cleanser.

Besides refractive indices, the size of particles, hardness, and abrasive factors of abrasive substances for use in the gel, are noted. The abrasive particles are preferably substantially 200 mesh or finer, and even finer than 400 mesh. The importance of hardness in itself is limited somewhat since though one abrasive may be harder than another the harder one, if finer, may still be as suitable as the abrasive of lesser hardness. The range of hardness of abrasives in the gel is, in general, between 2 and 7, and preferably between substantially 2 and 5 on the Mohs scale. The abrasive factor of an abrasive for use in an abrasive gel composition is from substantially 3 to 15. This is for abrasives in general. When using very hard abrasives, the particle size thereof is reduced.

The abrasive factor indicates the relative abrasiveness of materials used as abrasives. It is derived in a procedure and with an apparatus standardized for use in dentistry. The apparatus includes means for stroking a brush head of a tooth brush across the surface of a stainless steel metal plate, a form of which is known as "stainless strip." The plate has a high polish, is ¾ inch wide and 3 inches long. The thickness is not greater than 3/16 inch, and is generally substantially 1/16 inch. The hardness of the plate is maintained uniform at substantially an average hardness of dental enamel which is calculated to have an average Rockwell hardness of C 28. In a test, the plate is held in place at the bottom of a trough or cup while brushing the surface. The trough is filled with a mixture of the abrasive under test in glycerine in the form of a medium thick slurry which does not permit easy settling of the abrasive, and yet the mixture is not so thick that by drawing the brush over the plate the mixture merely piles up at either end of the trough. In other words, there must be sufficient flow in the mixture so that the metal plate is constantly covered with the mixture during the brushing. The apparatus is set for a given number of brush strokes. The selected number for present purposes is 10,000. Brushes used are of uniform structure. A new tooth brush is used for each test to avoid inaccuracies. The handle of a brush may be cut off at the end of the rows of bristles. Brushes are chosen with either three or four rows of bristles, and the ends of the tufts are cut off at right angles. The metal plates are weighed after drying in a dessicator before a test. After the brushing, the plates are washed thoroughly, then dried with a cloth and in a dessicator, and thereafter reweighed. The weight loss in milligrams represents the abrasion factor.

Abrasives and their abrasive factors are noted as illustrations as follows: alumina A-5, 15.6; fine pumice, 11.0; pumice F.F., 10.0; corundum number 2600, 9.3; mullite HCl extracted, 9.1; corundum number 1200, 8.2; pumice coarse, 7.9; pumice flour, 6.4; kaopolite S.F., 2.2; hydrate alumina C-31, 0.2.

As is also the case regarding Cab-O-Sil, finely divided plastics are not abrasive but are useful as scouring materials which mechanically dislodge foodstuffs and other particles on dentures, and do not scratch denture surfaces. Such synthetic resins and plastics as the following are noted: "Microthene" (microfine polyethylene powder of less than 30 micron particle diameter; made by U.S. Industrial Chemicals Co.); ion exchange resins such as "Amberlite" (acid form, micro pulverized; made by Rohm and Haas); amino-plastics such as formaldehyde condensation products of urea, thiourea, melamine, etc.; formaldehyde condensation products of phenol, cresols, etc.; acrylic resins; epoxy resins; polyester resins of fibers made therefrom; hydrocarbon polymers and copolymers including polystyrene, polyethylene, polypropylene.

In the method of preparation of the acid gel as set forth in the above application Ser. No. 732,086, certain sequences in the steps are found to yield more desirable results than others. With certain combinations of ingredients cleansers are made which have certain combinations of characteristics, referred to above, while other combinations of ingredients yield other combinations of those characteristics. A change of sequence in steps of preparation in each case changes the combination of characteristics of the product. For instance, a method employed comprises mixing a solvent and surfactant together, followed by adding and mixing in slowly the acid component and then the gelling component, stirring to remove bubbles and applying vacuum if necessary. A good gel cleanser is obtainable with different solvents, or surfactants or acids or gelling components. With certain preferred constituents a glass-clear gel is obtained. With others, the gel may not be clear but the gel will have combinations of the other desired characteristics.

ABS acid, or dodecylbenzene sulfonic acid, has a very pronounced effect on the viscosity of a Cab-O-Sil gel made with solvents used in the present process, such as, for example, propylene glycol, isopropanol and water. Instead of forming a crumbly, thick gel by initially mixing Cab-O-Sil with a mix of these solvents, a very thin fluid is preferably formed by mixing a very small amount of ABS acid with the solvent mix and then adding the Cab-O-Sil. The small amount of the acid, introduced as stated, is found to increase the reduction of viscosity more than expected. In this sequence, an undue stiffening may be avoided in an intermediate stage in the method of preparation. In subsequent stages the remaining portion of an acid component is added followed by addition of a decolorizing agent if needed, and addition of an auxiliary surfactant for adjustment of consistency, if desired.

A method, particularly where the sulfonic acids are used, comprises mixing together the acid and solvent components, stirring in the gelling agent, and then adding an amine to form an amine salt with part of the acid in situ. An auxiliary surfactant may finally be added if desired. A preferred procedure comprises including a surfactant or a portion of the sulfonic acid sufficient to avoid initial lumping when the gelling agent is added. Having added the remaining portion of the acid after the addition of the gelling agent, a bleaching agent may then be used to decolorize the mix if the sulfonic acid produces an undesired colored product. The amine and an auxiliary surfactant may finally be added as desired. This provides a glass-clear gel of preferred structure, and, as pointed out, the preparation of a gel with a complete combination of the desired characteristics is made possible.

A further method comprises a sequence of steps which is particularly advantageous in large-scale production. For instance, a solvent, such as isopropanol, is mixed with a portion of the entire amount of an acid agent, such as the above-named Conoco SA—597, used in the product. Glycerine and distilled water are introduced and stirred into the first mix. The stirrer is kept at medium speed and "Cab-O-Sil" is gradually added until a thick gel without lumps is formed. Hydrogen peroxide is added to the gel and mixed in. Then the remaining portion of the acid is added while stirring. Triethanolamine (TEA) is added to the gel that has formed, while stirring, and thereafter the mix is allowed to cool (heat is generated on addition of the TEA). All entrapped air bubbles are removed by applying vacuum to a thin film-like, moving or flowing layer of the mix. A vacuum of at least 20 inches mercury is satisfactory. Tween 20 (polyoxyethylene (20) sorbitan monolaurate) or other hydrophilic surfactant having an HLB number above about 10, is thereafter mixed in until the batch is of uniform consistency. The initial portion of the acid is added to break down any early occurrence of agglomeration in the process. The Tween 20 serves to deagglomerate the mix when necessary, and causes a final thickening thereof.

In its preferred form, the acid gel of this invention is a gel distinct from a salve or ordinary paste and distinct from a liquid or free-flowing substance. It is preferably a gel with the characteristics mentioned above, and which can be readily packed in, and dispensed from a squeeze-tube without causing a thinning during handling in trade and by the consumer. The gel for dispensing in tubes is a semisolid, homogeneous-appearing substance that appears to be elastic and jellylike or more or less rigid, and resistant to free-flow and yet spreadable in a layer at normal atmospheric temperatures and pressures. A gel has been defined as a disperse system consisting typically of a high molecular weight compound or an aggregate of small particles in very close association with a liquid. Acid gels of the present invention have been prepared which are believed to come within the terms of technical definitions of gels.

The Table I below, includes a number of examples of formulations that serve to illustrate the preparation of acid gels. Table II includes observations made as to characteristics of the products of these formulations after a period of six or more months. In each example, the same sequence of steps has been employed in preparing the acid gel except as otherwise noted. The liquid components such as propylene glycol and the surfactant are mixed, the acid component is added while slowly stirring, the mixture is gently heated to about 50° C. Then the Cab-O-Sil is added, which is the grade first mentioned, though other grades may be used. The heating is continued, and the total mixture is occasionally stirred to expel the air bubbles as much as possible. The remaining air bubbles in some cases disappear of their own accord on standing. Vacuum is applied at times to such mixes to assist in removing bubbles. When the surfactant is a solid, it may be dissolved in the propylene glycol by heating, or it may be initially melted by heating.

By way of explanation, the following is noted with respect to ingredients mentioned in the above table: Polypropylene glycol used has an average molecular weight of 1,200 and of a range from 1,000 to 1,400. Conoco sulfonic acid 400, Conoco sulfonic acid LS—320, and Nacconol SZA are typical alkyl-benzene sulfonic acid products of the general type known as ABS acids. They are commercial grades of dodecylbenzene sulfonic acids. (Conoco acids are made by the Petrochemical Division of Continental Oil Co. Nacconol SZA is made by the National Aniline Division of Allied Chemical Corporation.) Sulfamic acid is amido-sulfonic acid, the formula of which is $H_2N.SO_2.OH$.

Among the surfactants in the above table, and in examples given below, there are non-ionic, cationic, and anionic surfactants. Dowfax 9N9 is said to be nonylphenol condensed with nine molecules of ethylene oxide (made by Dow Chemical Company). Tween 80

Table I

| Example No. | Solvent amount | Surfactant, amount | Acid, amount | Cab-O-Sil, amount |
|---|---|---|---|---|
| 1 | Propylene glycol, 7 ml. | Dowfax 9N9, 10 ml. | Conoco 400, 2g. | 1.6 g. |
| 2 | Propylene glycol, 7ml. | Dowfax 9N9, 10 ml. | Nacconol SZA, 2g. | 1.6 g. |
| 3 | Propylene glycol, 7 ml. | Dowfax 9N9, 10 ml. | Conoco LS-320, 2g. | 1.6 g. |
| 4 | Propylene glycol, 7 ml. | Dowfax 9N9, 10 ml. | p-toluene sulfonic acid, 1g. | 1.6 g. |
| 5 | Propylene glycol, 7 ml. | Dowfax 9N9, 10 ml. | benzene sulfonic acid, 1g. | 1.6 g. |
| 6 | Propylene glycol, 7 ml. | Dowfax 9N9, 10 ml. | sulfamic acid, 1g. | 1.6 g. |
| 7 | Propylene glycol, 7 ml. | Tween 80, 10 ml. | Conoco LS-320, 2g. | 1.2 g. |
| 8 | Polypropylene glycol, 7 ml. | Dowfax 9N9, 10 ml. | Conoco LS-320, 2g. | 1.6 g. |
| 9 | Propylene glycol, 7 ml. | Ethofat 242/25, 10 ml. | Conoco LS-320, 2g. | 1.6 g. |
| 10 | Propylene glycol, 10 ml. | Ethomeen S/12, 10 ml. | Conoco LS-320, 15g. | 1.6 g. |
| 11 | Propylene glycol, 7 ml. | Brij 30, 10 ml. | Conoco LS-320, 2g. | 1.6 g. |
| 12 | Propylene glycol, 10 ml. | Ethomid 0/15, 10 ml. | Conoco LS-320, 10g. | 1.5 g. |
| 13 | Propylene glycol, 7 ml. | Sellogen Conc., 10 ml. | Conoco LS-320, 2g. | 1.6 g. |
| 14 | propylene glycol, 7 ml. | Pluronic L-44, 10 ml. | Conoco LS-320, 2g. | 1.6 g. |
| 15 | Propylene glycol, 7 ml. | Pluronic L-64, 10 ml. | Conoco LS-320, 2g. | 1.6 g. |
| 16 | Propylene glycol, 7 ml. | Trepolate T-60, 10 ml. | Conoco LS-320, 2g. | 1.6 g. |
| 17 | Propylene glycol, 7 g. | Trepenol WAT, 10 g. | Conoco LS-320, 2g. | 1.0 g. |
| 18 | Propylene glycol, 7 ml. | Renex 36, 10 ml. | Conoco LS-320, 2g. | 1.6 g. |
| 19 | Renex 36, 17 ml. | (no other liquid used) | Conoco LS-320, 2g. | 1.0 g. |
| 20 | Hyamine 3500, 80% conc., 17 g. | (no other liquid used) | Conoco LS-320, 2g. | 1.0 g. | is polyoxyethylene (20) sorbitan monooleate. Tween 20 is polyoxyethylene (20) sorbitan monolaurate. Brij 30 is polyoxyethylene (4) lauryl ether, one of a number of polyoxyethylene fatty alcohol ethers. Renex 36 is a polyoxyethylene (6) tridecyl ether. Myrj 52 is polyoxyethylene (40) stearate. (Tween, Brij, Myrj, and Renex are made by the Atlas Powder Company.) The Pluronics L—44 and L—64 are essentially ethylene oxide condensation products of polyoxypropylene glycols. (The Pluronics are made by Wyandotte Chemicals Corporation.) Ethofat 242/25 comprises polyoxyethylene glycol esters of fatty acids, and is said to be a 70% rosin fatty acid ethoxylated with 15 mols of ethylene oxide. Ethomeen S/12 is ethoxylated (2 mols) soybean amine. Ethomide 0/15 is ethoxylated (5 mols) oleyl amide. (Ethofat, Ethomid, and Ethomeen are made by Armour Industrial Chemical Company.) Sellogen Conc. is a taurine derivative and is said to be sodium oleylmethyltaurate (made by Jacques Wolf and Co., a division of Nopco Chemical Company). Trepolate T—60 is a 60% aqueous solution of the triethanolamine salt of an ABS acid, such as dodecylbenzene sulfonic acid. Trepolate YLA is monoisopropylamine salt of dodecylbenzene sulfonic acid. Trepenol WAT is the triethanolamine salt of lauryl sulfate (the last three are made by Treplow Products, Inc.). Span 80 is sorbitan monooleate and is made by Atlas Powder Company. Nonisol 250 is the ester of lauric acid and polyglycol 1,000 and is made by Geigy Industrial Chemicals. Hyamine 3,500 comprises 80% N-alkyl ($C_{12}$ to $C_{16}$) dimethyl benzyl ammonium chloride and 20 % ethanol (made by Rohm & Haas Company).

After long standing, as indicated above, the acid gels of Examples 1 to 20 in Table I were examined from the standpoint of characteristics such as, color, thickness of gel, fluidity, presence or absence of syneresis liquid, presence or absence of bubbles, and clarity or opacity, as noted in Table II below.

Table II

| Example No. | Characteristics of Acid Gels of Examples 1 to 20 |
|---|---|
| 1 | Light yellow; medium thick gel; tends to flow readily; no bubbles; glass-clear |
| 2 | Lighter than 1; medium thick gel; tends to flow readily; no bubbles; glass-clear |
| 3 | Very light yellow; medium thick gel; tends to flow readily; no bubbles; glass-clear |
| 4 | Water-White; medium thick gel; tends to flow readily; no bubbles; glass-clear |
| 5 | Water-White; medium thick gel; tends to flow readily; no bubbles; glass-clear |
| 6 | Very light tan; medium thick gel; tends to flow readily; no bubbles; glass-clear |
| 7 | Light tan; very thick gel; slight amount syneresis liquid; barely flows; no bubbles; glass-clear |
| 8 | Very light tan; very thick gel; no syneresis liquid; barely flows; no bubbles; glass-clear |
| 9 | Dark brown; very thick gel; slight amount of syneresis liquid; no flow; no bubbles; glass-clear |
| 10 | Dark brown; very thick gel; almost no odor; barely flows; few large bubbles; glass-clear |
| 11 | Faint yellow; very thick gel; slight amount syneresis liquid; no flow; no bubbles; glass-clear |
| 12 | Dark tan; solid gel; no syneresis; no flow; large bubbles; glass-clear |
| 13 | Water-white; solid gel; no syneresis; no flow; abundance of bubbles; glass-clear |
| 14 | Very light cream; medium thick gel; fairly fluent; no bubbles; glass-clear |
| 15 | Very light cream; medium thick gel; flows slowly; no bubbles; glass-clear |
| 16 | Light tan; medium thin gel; fairly fluent; no bubbles; glass-clear |
| 17 | Light tan; thin gel; flows readily; no bubbles; glass-clear |
| 18 | Almost water white; medium gel; flows readily; no bubbles; glass-clear |
| 19 | Almost water white; very thick gel; practically no flow; no bubbles; not glass-clear |
| 20 | Light tan; good thick gel; flows slowly; some bubbles; not glass-clear. |

The following examples of formulations in Table III illustrate the use of such mineral acids as hydrochloric, sulfuric, and phosphoric, and carboxylic acids such as formic and acetic, in the acid gel:

Table III

| Example No. | Solvent | Surfactant | Acid | Cab-O-Sil |
|---|---|---|---|---|
| 21 | Propylene glycol, 7 ml. | Triton X-45, 10 ml. | Conc. hydrochloric (36%) 3 ml. | 1.6 g. |
| 22 | Propylene glycol, 7 ml. | Triton X-45, 10 ml. | Conc. sulfuric (98%) 1 ml. | 1.6 g. |
| 23 | Propylene glycol, 7 ml. | Triton X-45, 10 ml. | Conc. phosphoric (85%) 2 ml. | 1.6 g. |
| 24 | Propylene glycol, 7 ml. | Triton X-45, 10 ml. | Conc. formic (90.8%) 2 ml. | 1.6 g. |
| 25 | Propylene glycol, 7 ml. | Triton X-45, 10 ml. | Glacial acetic (99.7%) 2 ml. | 1.6 g. |
| 26 | Propylene glycol, 7 ml. | Dowfax 9N9, 10 ml. | Hydrochloric (36%) 3 ml. | 1.6 g. |
| 27 | Propylene glycol, 7 ml. | Dowfax 9N9, 10 ml. | Sulfuric (36%) 2 ml. | 1.6 g. |
| 28 | Propylene glycol, 7 ml. | Dowfax 9N9, 10 ml. | Phosphoric (36%) 3 ml. | 1.6 g. |
| 29 | Propylene glycol, 7 ml. | Dowfax 9N9, 10 ml. | Formic (36%) 3 ml. | 1.6 g. |
| 30 | Propylene glycol, 7 ml. | Dowfax 9N9, 10 ml. | Acetic (36%) 3 ml. | 1.6 g. |

Table III—Continued

| Example No. | Solvent | Surfactant | Acid | Cab-O-Sil |
|---|---|---|---|---|
| 31 | Denatured ethyl alcohol, 7 ml. | Dowfax 9N9, 10 ml. | Hydrochloric (36%) 3 ml. | 1.6 g. |
| 32 | Isopropanol, 15.6 ml., water, 8.0 ml. | Dowfax 9N9, 40 ml. | Hydrochloric (36%) 9.3 ml. | 7.7 g. |

Triton X—45 in Table III is isooctylphenyl polyethoxyethanol (made by Rohm and Haas Co.). The composition of Dowfax has previously been noted.

In each of the examples 21 to 30 inclusive, in Table III above, the solvent and surfactant are mixed together, the acid is then added, and finally the Cab-O-Sil is introduced, whereupon the products are degassed as much as possible by applying a vacuum. In examples 31 and 32, the Cab-O-Sil is added to the mixture of solvent and a surfactant, while slowly stirring, and a vacuum is applied to remove air introduced with the Cab-O-Sil. This can be accomplished very readily at this stage by applying vacuum for only a very short period of time. Most of the bubbles break spontaneously. The acid is then added to and gently folded in the product from which bubbles have been removed. Bubble-free acid gel products are thus obtained.

Characteristics of the products of formulations in Table III are noted in Table IV below.

Table IV

| Example No. | Characteristics of Acid Gels of Examples 21 to 32 |
|---|---|
| 21 | Glass-clear; very faint yellow; medium-thick gel; no bubbles; flows readily |
| 22 | Glass-clear; light yellow; medium-thick gel; no bubbles; flows readily |
| 23 | Glass-clear; light yellow; medium thick gel; no bubbles; flows readily |
| 24 | Glass-clear; light yellow; separation into gels of different thickness; no bubbles; portion of gel non-flowing other portion flows readily |
| 25 | Not discernibly different from 24 |
| 26 | Glass-clear; water-white; thicker than medium; no bubbles; flows readily |
| 27 | Glass-clear; water-white; medium-thick gel; no bubbles; flows readily |
| 28 | Glass-clear; water-white; thicker than medium; no bubbles; flows readily |
| 29 | Like 24 |
| 30 | Like 25 but thinner |
| 31 | Clear; faintly yellow; medium-thin gel containing a few bubbles; flows readily |
| 32 | Glass-clear; faintly yellow; rather thick gel; no bubbles; almost no flow. |

The following examples illustrate additional acid gel formulations, certain of which are preferred. Preferred methods of preparing clear gel cleansers with a desirable gel structure are also indicated. It has been found that in the use of ABS acids, inclusion of auxiliary surfactants provides improved, favorable results. The effects are also noted by adding triethanolamine, particularly in certain preferred stages, whereby the triethanolamine salt of the sulfonic acid, such as dodecylbenzene sulphonic acid, is formed in situ. A preferred range of the free acid in the product is noted as substantially 5 to substantially 10%.

The proportions of ingredients in these examples are given in parts by weight except where otherwise noted. The alkyl benzene sulfonic acid in the formulations is listed as LS—320; the triethanolamine is listed as TEA: the propylene glycol as PG; and the Cab-O-Sil and C-O-S.

EXAMPLE 33

| | |
|---|---|
| PG | 20.0 |
| Isopropanol | 15.0 |
| Water | 14.0 |
| C-O-S | 6.4 |
| LS-320 | 36.4 |
| 30% $H_2O_2$ | 0.66 |
| Tween 80 | 2.0 |
| TEA | 13.2 |

PG, isopropanol and water are mixed together, and C-O-S is stirred in while heating moderately. Vacuum is applied to remove air, during which about 4 parts by weight of water and isopropanol evaporate. LS—320 is introduced whereupon 0.3 part by weight of volatiles is lost. Thereafter the $H_2O_2$ is added and mixed in. This is followed by addition of Tween 80 and finally TEA, each being successively stirred in.

The peroxide serves to bleach the brown color imparted by the LS—320, and it does this without noticeably affecting the viscosity of the gel, and without formation of bubbles.

The product has about 7.5% free acid as dodecylbenzene sulfonic acid.

Coloring, such as Methyl Red, is added. The red-colored gel is of excellent structure and is crystal-clear.

The same results are obtained with this formulation is large or small bulk preparation.

EXAMPLE 34

| | |
|---|---|
| PG | 600 |
| Isopropanol | 450 |
| Water | 390 |
| Span 80 | 30 |
| C-O-S | 192 |
| S-320 | 1092 |
| 30% $H_2O_2$ | 33 |
| TEA | 396 |
| Tween 20 | 30 |

Tween 20 is said to be polyoxyethylene sorbitan monolaurate.

The first four ingredients are mixed together, producing an emulsion or suspension. C-O-S is added with stirring, producing an intermediate thick, translucent gel. Thereafter LS—320 is added very slowly in a thin stream, with gentle stirring. The gel thins out to a clear jelly. $H_2O_2$ is stirred into the jelly, then TEA is added, and finally Tween 20 with gentle stirring. After prolonged standing the product matures into a beautiful medium-thick gel which is glass-clear, light yellow in color, contains no bubbles, is resistant to flow. There is no graininess and no syneresis.

EXAMPLE 35

| | | |
|---|---|---|
| PG | 20.0 | |
| Isopropanol | 15.0 | |
| Water | 13.0 | |
| LS-320 | 2.0 | |
| C-O-S | 6.4 | |
| LS-320 | 34.4 | |
| 30% H$_2$O$_2$ | 1.1 | |
| TEA | 13.2 | |
| Tween 20 | 2.0 | |

The first four ingredients in this list are measured out and mixed together. It is found that by including a small portion of the total amount of LS—320 before mixing in the C-O-S in the solvent mix, there is less possibility of forming an initial stiff gel with the C-O-S at this stage. The said first four ingredients in the proportion listed are poured over the C-O-S and the mixture is gently stirred, forming a translucent, thin, very light tan jelly, from which air escapes spontaneously without difficulty. Then the second, larger portion of LS—320 is added slowly, in a thin stream, with stirring. No lumps are formed at this stage. The peroxide is next introduced and bleaches the mix to a lighter color. The TEA is stirred in slowly, and then Tween 20 is finally added with stirring. The gel, in its desired form, is produced substantially immediately in this procedure. It remains smooth and thick after long standing for six months or more, and resists flow, is crystal-clear, light yellow in color. There are no bubbles. There is no graininess or syneresis.

As illustrated in Example 35, in a preferred method of preparing the acid gel, a quicker removal of bubbles is effected, and a quicker or instantaneous formation of an acid gel with a desired combination of preferred characteristics takes place. This example, as well as others, also illustrates the adjustment of the consistency of a gel after addition of the TEA by addition of a hydrophilic, nonionic surfactant with a high HLB number above 12. Though thickening is effected and though peroxide is introduced to decolorize the brown, commercial alkyl benzene sulfonic acid to a light yellow color, a crystal-clear gel is obtained.

Example 36

| | | |
|---|---|---|
| Glycerine | 20 ml. | (1) |
| Isopropanol | 15 ml. | (2) |
| Water | 10 ml. | (3) |
| LS-320 | 2 ml. | (4) |
| C-O-S M-5 | 6.4 grams | (5) |
| LS-320 | 34.4 grams | (6) |
| H$_2$O$_2$ (30% solution) | 1.0 ml. | (7) |
| TEA | 13.2 grams | (8) |
| MYRJ 52 | 2.0 grams | (9) |

The first four ingredients when mixed, form a clear solution. This solution is poured onto the C-O-S with mixing until a relatively thin and clear gel is formed and air bubbles are substantially completely removed. The ingredients (6) (7) (8) and (9) are then incorporated. The surfactant (9) has an HLB number of 16.9 and is chemically polyoxyethylene (40) stearate.

EXAMPLE 37

| | | |
|---|---|---|
| Glycerine | 20 ml. | (1) |
| Isopropanol | 15 ml. | (2) |
| Water | 10 ml. | (3) |
| Conoco SA-597 (biodegradable) | 2 ml. | (4) |
| C-O-S M-5 | 6.4 grams | (5) |
| Conoco SA-597 | 34.4 grams | (6) |
| H$_2$O$_2$ 30% | 1.0 ml. | (7) |
| TEA | 13.2 grams | (8) |
| Tween 20 | 2.0 grams | (9) |

The first four ingredients are mixed and poured onto the C-O-S which is incorporated until a fairly thin, clear gel is obtained practically free from bubbles. A vacuum is applied briefly, whereupon ingredients (6), (7), (8) and (9) are added. A glass-clear, light yellow gel is obtained.

Considerable difficulty was experienced in the past in obtaining acid gels of the types described, free from bubbles. While bubble-free gel products are obtainable by the processes indicated above, certain preferred sequences of steps are found to yield highly improved results. For example, in the preparation of an acid gel with ingredients including a solvent, surfactant, acid, and Cab-O-Sil, as compared with the results obtained in the sequence in which the Cab-O-Sil is added last, radically different, though preferred, results are obtained by initially adding Cab-O-Sil to a mixture of solvent and surfactant. The air in the resulting mix is removed more readily by vacuum, and air bubbles tend to break spontaneously. On prolonged standing without the use of vacuum, air eventually escapes substantially completely. Application of vacuum for a short time removes all of the air. Thereafter, acid is gently folded in, and a bubble-free product results.

Bubble-free products are further made possible by initially subjecting Cab-O-Sil to a vacuum treatment as a preliminary step. The Cab-O-Sil may be placed in a container in a vacuum desiccator. Under the subatmospheric or reduced pressure, Cab-O-Sil increases in volume somewhat, and by as much as substantially 20 to 40% without dust formation. The liquids of a formation are then introduced, previously mixed, but preferably in the preferred sequence indicated hereinabove. The liquids enter the interstices between the Cab-O-Sil particles, and a substantially bubble-free product results. In apparatus erected for this purpose, a container similar to a standard three-neck round bottom flask may be used with a vacuum-seal glass stirrer having a motor-driven shaft connection through the center neck. The stirrer is provided with collapsible, Teflon blades. A vacuum pump connection is provided for one side-neck, and a means similar to a separatory funnel is connected to the other side-neck. In operation, the Cab-O-Sil is measured and introduced into the container, and vacuum is applied. The liquids are measured and introduced through the funnel in the desired sequence, with preferred, mild stirring, while applying vacuum.

In large-scale production, and without vacuum equipment, successful operations have been realized in producing substantially bubble-free gels acceptable for use, by following a sequence substantially as set forth above. In preparing a gel product with the formula of Example 37, for instance, the glycerine, propylene glycol, isopropanol, water, and the small portion of ABS acid are mixed together and then added to and mixed with the Cab-O-Sil. The main portion of the ABS acid, hydrogen peroxide, and triethanolamine are then added in succession. The resulting solution contains a fair number of bubbles. One of three methods has been used to remove these bubbles. In one method, the solution is permitted to stand quiescently, at an elevated temperature of approximately 30° to substantially 50° C. in a closed container to prevent loss of vapors. Gradually the solution becomes substantially bubble-free. In the second method, the treatment is the same but in addition, the solution is very slowly stirred or mildly agitated. When left entirely quiescent as in the first method, an incipient gel structure is developed which somewhat hinders the escape of the air bubbles and retards the release thereof. In the second method, the mild agitation, which leads to coalescence of small air bubbles to form larger ones, is sufficient to prevent the formation of the incipient gel structure, with resultant lower viscosity and improved speed of air release. In the third method, the above-mentioned solution is poured onto a rotating disc to form a flowing thin film while vacuum is applied. The vacuum may be at 20 to 30 inches of mercury. The bubbles are thereby released from the solution.

Into the glass-clear and bubble-free solution is then slowly introduced and mixed the final thickening agent, such as Tween 20 and others mentioned, with caution while preventing reintroduction of air bubbles. The product is permitted to return to room temperature, and to mature fully to its final gel structure and viscosity, which usually takes several days.

In the use of hydrogen peroxide, followed by the addition of triethanolamine and Tween 20, as in the above Example 37, after producing a bubble-free mix with the first seven items in the formula, re-formation of bubbles or re-introduction of gases generally occurs readily at this point if proper precautions are not taken. The hydrogen peroxide, in particular, is apt to cause bubbling apparently because it oxidizes oxidizable substances in the mixture and also releases oxygen in the mix. Viscosity at that stage is generally relatively high and is reduced after all or sufficient peroxide and triethanolamine are added, thereby releasing bubbles. Any triethanolamine salt of the ABS acid that tends to separate out as a solid or in gelatinous form, is permitted to dissolve in the solvents. The mix is now in a relatively thin liquid state and becomes thinner at elevated temperatures, rendering easiest the release of bubbles. The application of a vacuum to a moving thin film of this mix, as heretofore described, is highly effective in the removal of bubbles. With slow introduction and mixing in of the final thickening agent, such as Tween 20, or an equivalent thickener, while preventing inclusion or entrappment of air, a bubble-free gel of attractive appearance results.

Though transparent and glass-clear acid gels are provided as prescribed hereinabove, they may range from colorless to colored in appearance. Coloring may be added or it may be imparted by color-producing substances in ingredients employed. If the Cab-O-Sil is not freed from its iron content, a gel produced therewith is apt to appear yellow though transparent, instead of water-white. In the preparation of gels containing impurities of ABS acid and other organic components, it is also possible that certain colored bodies are formed, as for instance, by oxidation by the hydrogen peroxide.

It is possible to vary the proportions of each of the different ingredients in a combination, and to avoid making a gel having any one or more of the undesired characteristics including lumpiness, syneresis, graininess, free-flowing, odoriferous, and yet to provide a product with any one or more of the preferred characteristics heretofore mentioned including clearness or transparency (rather than translucency or opaqueness), freedom from bubbles, and a consistency that resists flow at normal atmospheric temperatures and yet permits the gel to be readily dispensed from a squeeze tube, and easily spread on denture surfaces. In preparing a gel, the thickness that renders it resistant to flow but readily dispensed from a squeeze tube and spreadable in a layer on denture surfaces or on a brush, serves to determine the proportions of the ingredients which form a preferred acid gel.

The following examples illustrate the preparation of the abrasive acid gel of the present invention:

EXAMPLE 38

| | |
|---|---|
| Acid gel (such as that illustrated hereinabove) | 50 |
| Silica gel (100 to 200 mesh) | 5 |

The silica gel is first thoroughly wetted with anhydrous isopropanol (about 5 ml. to about 55 grams of the acid gel plus the abrasive) in order to expel air from the silica. Excess isopropanol is permitted to evaporate until the silica gel is no longer visibly covered with liquid but is still moist. The acid gel is mixed thoroughly and gently with the alcohol moistened silica gel. A substantially glass-clear gel is obtained. The isopropanol may be evaporated at room temperature, and may be completely removed by vacuum treatment if desired. An amount of isopropanol left in the gel should preferably be less than that which thins out the gel detrimentally, or less than that which affects the clarity of the product because of the lower refractive index of the isopropanol (1.38).

EXAMPLE 39

| | |
|---|---|
| Acid gel | 50 |
| Mullite (acid-washed; particle size 4 to 5 microns) | 1 |

These constituents are mixed, and the mixture is prepared in substantially the same manner as that prescribed in Example 38. In view of the lack of porosity of the abrasive, the retained amount of isopropanol is negligible. The gel product is translucent in bulk but transparent in a relatively thin layer.

EXAMPLE 40

| | |
|---|---|
| Acid gel | 50 |
| "Synthetic Pumice" (foam glass) 200 mesh | 2.5 |

A mixture is prepared with these constituents as set forth in Example 38. With 1.6 parts by weight of isopropanol retained by the abrasive in the moistening procedure, the final product is lightly turbid.

EXAMPLE 41

| | |
|---|---|
| Acid gel | 50 |
| "Min-U-Sil" (particle size— 30 microns) | 0.5 |

EXAMPLE 41-Continued

Processing in this example is the same as that set forth in Example 38. Only about 0.6 part by weight of isopropanol is retained by the abrasive in the moistening thereof. The final product is a lightly turbid, barely flowing gel.

EXAMPLE 42

| | |
|---|---|
| Acid gel | 50 |
| Synthetic corundum (white aluminum oxide No. 600 (8 microns) sold by American Graded Sand Company) | 0.1 |

Processing is the same as in the preceding examples. The final gel product is a little more turbid than the products of Examples 40 and 41.

EXAMPLE 43

| | |
|---|---|
| Acid gel | 50 |
| Tridymite (through 200 mesh) | 1 |

The tridymite is mixed with isopropanol to form a paste, air is evacuated, excess alcohol is drained off, and the moistened abrasive is mixed with the acid gel. The final product is translucent in thick layers and transparent in thin layers.

EXAMPLE 44

| | |
|---|---|
| Acid gel | 50 |
| Cristobalite (through 400 mesh) | 1 |

The process of preparation is similar to that in Example 43. The final product is transparent in thin layers and translucent in very thick layers, though somewhat less transparent than the product of Example 43.

Example 45

| | |
|---|---|
| Acid gel | 50 |
| Corundum (particle size— 4 microns) | 1 |

Processing is similar to that in Example 43. The final product is fairly turbid but very uniform.

In the above examples, the acid gel contains specifically Cab-O-Sil, referred to hereinbefore as a gelling agent. In examples set forth below, an acid gel is prepared with Natrosol heretofore mentioned. Natrosol and distilled water are mixed with constant stirring while gradually adding 12 parts by weight of Natrosol to approximately 388 parts by weight of water, forming about a 3% Natrosol gel. It is a very stiff, sufficiently stiff gel. By thoroughly mixing ABS acid therewith in the proportion of 2.5 parts by weight of the acid and 50 parts by weight of the gel, and with removal of entrapped air, a glass-clear, light tan, medium thick acid gel is formed. A formulation of another acid gel is prepared on mixing 0.5 part by weight of ABS acid with 50 parts by weight of the aforesaid Natrosol gel.

A substantially transparent gel may be prepared with an abrasive content by mixing the abrasive, such as silica gel from which entrapped air has been removed as described above, with Natrosol gel prepared with Natrosol and water as previously described. The silica gel (through 100 mesh screen) may be in a proportion up to about 20 percent by weight of the gel, thereby providing an abrasive-containing Natrosol gel that is semi-transparent in thin layers and translucent in bulk. Synthetic pumice, five parts by weight, moistened with 1.5 parts by weight of isopropanol, and thoroughly mixed with Natrosol gel, provides a barely flowing, semi-translucent gel.

Example 46

| | |
|---|---|
| Natrosol gel | 50 |
| Mullite (acid-washed; through 100 mesh) | 1 |
| ABS acid | 1 |

The Natrosol gel and ABS acid are thoroughly mixed. Mullite, which is initially pasted with isopropanol as heretofore described to remove air, is added and thoroughly mixed in. The product is a fairly translucent, light tan, barely flowing gel.

Example 47

| | |
|---|---|
| "Synthetic Pumice" (foam glass) 100 mesh | 5 |
| Natrosol gel | 50 |
| ABS acid | 5 |

The foam glass is pasted with isopropanol as hereinabove described to remove air and moisten the abrasive particles. The paste formed is mixed with the Natrosol gel and acid. The final product is a barely flowing, semi-transparent, grayish-tan acid gel.

An attractive sales product, in a preferred form, can be provided in a transparent, plastic, dispensing tube from which, if or when desired, a substantially glass-clear or transparent acid gel with a desirable abrasive action is squeezed onto a removable denture or brush.

What is claimed is:

1. A substantially transparent acid gel containing an abrasive in a proportion that does not render the gel opaque but renders it sufficiently abrasive to remove oral deposits on a denture in a cleaning operation without scratching the denture surfaces, in which gel the said abrasive is in the proportion of substantially 0.1% to substantially 25% by weight, and the particles of said abrasive are of the size of less than substantially 200 mesh.

2. The composition, as claimed in claim 1, in which the proportion of the abrasive is substantially in the range of 0.1% to 25% by weight; the abrasive particles are substantially of the size of less than 200 mesh; the abrasive particles have substantially a hardness of 2 to 5 on the Mohs scale, and substantially an abrasive factor of 3 to 15.

3. The composition, as claimed in claim 1, in which the gel has a refractive index substantially in the range of 1.40 to 1.50; and in which the proportion of the abrasive in the said gel is substantially in the range of 0.1% to 25% by weight, the abrasive particles are substantially of the size of less than 200 mesh, the abrasive particles have substantially a hardness of 2 to 5 on the Mohs scale, and substantially an abrasive factor of 3 to 15.

* * * * *